(12) United States Patent
Sugita et al.

(10) Patent No.: US 10,309,869 B2
(45) Date of Patent: Jun. 4, 2019

(54) ENGINE TEST APPARATUS

(71) Applicant: A&D Company, Limited, Tokyo (JP)

(72) Inventors: Mitsuharu Sugita, Tokyo (JP); Yuta Egashira, Tokyo (JP); Keisuke Yasuno, Tokyo (JP)

(73) Assignee: A&D Company, Limited, Tokyo (JP)

( * ) Notice: Subject to any disclaimer, the term of this patent is extended or adjusted under 35 U.S.C. 154(b) by 10 days.

(21) Appl. No.: 15/658,518

(22) Filed: Jul. 25, 2017

(65) Prior Publication Data
US 2018/0031448 A1 Feb. 1, 2018

(30) Foreign Application Priority Data

Jul. 27, 2016 (JP) ................. 2016-147646

(51) Int. Cl.
| | |
|---|---|
| *G01M 15/02* | (2006.01) |
| *G01M 15/04* | (2006.01) |
| *G01P 3/36* | (2006.01) |
| *G01S 17/58* | (2006.01) |
| *G01S 17/88* | (2006.01) |
| *G01L 1/25* | (2006.01) |

(52) U.S. Cl.
CPC .......... *G01M 15/042* (2013.01); *G01M 15/02* (2013.01); *G01P 3/36* (2013.01); *G01S 17/58* (2013.01); *G01S 17/88* (2013.01); *G01L 1/25* (2013.01)

(58) Field of Classification Search
CPC .. G01M 15/04; G01M 15/044; G01M 15/042; G01M 15/02; G01L 3/242; G01L 1/25; G01L 5/26; G01L 5/133; G01S 17/58; G01S 17/88; G01P 3/36; F02D 41/1497
See application file for complete search history.

(56) References Cited

U.S. PATENT DOCUMENTS

| | | | | | |
|---|---|---|---|---|---|
| 4,023,403 | A | * | 5/1977 | Smith ................... | F02D 41/401 73/114.64 |
| 5,078,008 | A | * | 1/1992 | Yagi .................... | G01M 15/044 73/116.05 |
| 5,449,900 | A | * | 9/1995 | Halliwell ................ | G01D 5/26 250/231.13 |

(Continued)

FOREIGN PATENT DOCUMENTS

JP 5800001 B2 10/2015

*Primary Examiner* — Lisa M Caputo
*Assistant Examiner* — Brandi N Hopkins
(74) *Attorney, Agent, or Firm* — Locke Lord LLP

(57) ABSTRACT

An engine test apparatus includes a dynamometer connected to an engine through a shaft, and a control device configured to control operations of the engine and the dynamometer, and the engine test apparatus further includes a speed measuring device configured to measure a rotation speed of the output shaft of the engine and transmit the rotation speed to the control device the control device includes an engine control unit configured to control operation of the engine, and a dynamometer control unit configured to control operation of the dynamometer, the dynamometer control unit uses the rotation speed transmitted from the speed measuring device to generate a torque current command corresponding to a torque value to be generated by the dynamometer, in order to operate the engine controlled to be operated by the engine control unit in an unloaded state as if the shaft and the dynamometer are not connected.

4 Claims, 7 Drawing Sheets

(56) References Cited

U.S. PATENT DOCUMENTS

| | | | | |
|---|---|---|---|---|
| 5,465,624 | A * | 11/1995 | Tseytlin | G01P 3/366 |
| | | | | 73/653 |
| 2009/0100919 | A1* | 4/2009 | Sugita | F02D 41/1497 |
| | | | | 73/114.15 |
| 2013/0068002 | A1* | 3/2013 | Nagy | G01M 15/02 |
| | | | | 73/114.13 |
| 2014/0019081 | A1* | 1/2014 | Suzuki | G01M 15/02 |
| | | | | 702/113 |
| 2015/0101421 | A1* | 4/2015 | Takahashi | H02P 6/06 |
| | | | | 73/862.325 |
| 2016/0084735 | A1* | 3/2016 | Akiyama | G01M 15/04 |
| | | | | 73/116.05 |
| 2018/0003589 | A1* | 1/2018 | Akiyama | G01M 15/04 |

* cited by examiner (A)

(B)

ENGINE TEST APPARATUS

CROSS REFERENCE TO RELATED APPLICATIONS

This application is related to co-pending application: "ENGINE TEST APPARATUS" filed even date herewith in the names of Mitsuharu SUGITA, Yuta EGASHIRA and Keisuke YASUNO, which claims priority to Japanese Application No. 2016-147534 filed Jul. 27, 2016, and the above application is assigned to the assignee of the present application and is incorporated by reference herein.

BACKGROUND

Technical Field

The present invention relates to an engine test apparatus, for example, relates to an engine test apparatus including a dynamometer to measure various characteristics of an engine.

Related Art

Conventionally, a dynamometer system (engine test apparatus) has been used which has a dynamometer connected to a specimen including an engine to measure various characteristics of the engine by simulation. For example, a configuration of the dynamometer system is proposed in JP 5800001 B2. Here, with reference to FIG. 6, the configuration of the dynamometer system described in JP 5800001 B2 will be briefly described.

As illustrated in FIG. 8, a dynamometer system (engine test apparatus) 100 according to a related art includes a dynamometer D, a shaft (connecting shaft) S configured to connect an output shaft of an engine E and a rotation shaft of the dynamometer D, an engine control device 130 configured to control the engine E through a throttle actuator 120, an inverter 140 configured to supply electric power to the dynamometer D, a dynamometer control device 160 configured to control the dynamometer D through the inverter 140, a shaft torque sensor 150 configured to detect a torsion torque of the shaft S, and an encoder 161 configured to detect a rotation speed (rotation rate) of an output shaft of the dynamometer D.

Then, the engine control device 130 starts the engine E through the throttle actuator 120 at a predetermined time, and drives the engine E in a predetermined manner. In addition, the dynamometer control device 160 generates a torque current command corresponding to a torque value to be generated by the meter D, on the basis of a torsion torque (torsion torque at a portion closer to the dynamometer D) detected by the shaft torque sensor 150, and a rotation speed (rotation rate) of the dynamometer D detected by the encoder 161, and inputs the torque current command to the inverter 140 to control the operation of the dynamometer D.

Then, in the dynamometer system 100, the operation of the dynamometer D is controlled by a torque current command generated as described above, so that the engine E is controlled to be operated in an unloaded state as if the engine E is not connected to the shaft S and the dynamometer D, upon starting the engine E. That is, in the dynamometer system 100 described in JP 5800001 B2, "inertia compensation control" is performed in which the torsion torque of a portion of the shaft S closer to the dynamometer D, and the rotation speed (rotation rate) of the dynamometer D are used to determine a torque value to be generated by the dynamometer D, for control of an absorption torque of the dynamometer D.

CITATION LIST

Patent Literature

Patent Literature 1: JP 5800001 B2

SUMMARY

However, the inertia compensation control using the rotation speed (dynamometer rotation rate) of the dynamometer D according to the related art, has a problem that a frequency range for inertia compensation is limited. Specifically, as illustrated in FIG. 7A, when the dynamometer rotation rate is used for inertia compensation control, there is an antiresonance point in a frequency range around 100 Hz (see a portion A in FIG. 7A), so that the problem arises that the gain drops in this frequency range, and the inertia compensation performance cannot be expected over a wide area. Furthermore, as illustrated in FIG. 7B, when the dynamometer rotation rate is used, a phase advances in antiresonance (see portion B in FIG. 7B) and returns at the resonance point. Therefore, a problem also arises that when an inertia compensation closed loop is formed, resonance tends to occur at a resonance point. That is, since in the dynamometer system (engine test apparatus) 100 according to the related art, the inertia compensation control is performed using the rotation speed (dynamometer rotation rate) of the dynamometer D, so that the frequency range for inertia compensation is limited, and various characteristics of the engine may not be measured with high accuracy, upon starting the engine E or the like. Note that, in FIGS. 7A and B, broken lines represent dynamometer rotation rate transmission characteristics, and solid lines represent engine rotation rate transmission characteristics.

Incidentally, since there is no antiresonance point in the rotation speed (rotation rate) of the output shaft of the engine, when the rotation speed (rotation rate) of the output shaft of the engine can be used for the inertia compensation control as described above, the problems Is solved. However, in general, engine test apparatuses according to the related art are known to have a configuration in which the rotation speed (dynamometer rotation rate) of the rotation shaft of the dynamometer D is measured, and the measured dynamometer rotation rate is used to perform inertia compensation control, and no engine test apparatus is known to measure the rotation speed of the output shaft of the engine E, and use the measured rotation speed to control the dynamometer rotation.

The present invention has been made in view of the above problems, and it is an object of the present invention to provide an engine test apparatus capable of measuring various characteristics of an engine with high accuracy.

According to an aspect of the present invention, there is provided an engine test apparatus including a dynamometer connected to an engine through a shaft, and a control device configured to control operations of the engine and the dynamometer, in which the shaft has one end connected to an output shaft at one end of a rotation shaft of the engine, and the other end connected to a rotation shaft of the dynamometer, and includes a speed measuring device configured to measure a rotation speed of the output shaft of the engine and transmit the rotation speed to the control device the control device includes an engine control unit configured to control operation of the engine, and a dynamometer control unit configured to control operation of the dynamometer, the dynamometer control unit performs inertia compensation control by using the rotation speed transmitted from the speed measuring device to generate a torque current command corresponding to a torque value to be generated by the dynamometer, and outputting the torque current command to the dynamometer, in order to control operation of the dynamometer to operate the engine controlled to be operated by the engine control unit in an unloaded state as if the shaft and the dynamometer are not connected.

In this way, in the present invention, the speed measuring device is provided for measuring a rotation speed of the rotation shaft of the engine and transmitting the rotation speed to the control device. In the present invention, in order to operate the engine in an unloaded state as if the shaft and the dynamometer are not connected, the inertia compensation control for controlling the operation of the dynamometer is performed by using the rotation speed of the output shaft of the engine transmitted from the speed measuring device, to generate a torque current command corresponding to a torque value to be generated in the dynamometer, and outputting the torque current command to the dynamometer. According to this configuration, the frequency range for inertia compensation is not limited as in the inertia compensation control according to the related art using the rotation speed of the dynamometer (dynamometer rotation rate). Therefore, not only the behavior of an engine at starting up, but also rotation speed variation of the engine caused by explosion variation can be reproduced. Thus, according to an aspect of the present invention, characteristics of an engine can be measured with high accuracy as compared with a related art.

Further, in the present invention, the dynamometer is controlled by converting the behavior of the engine rotation rate into a torque, and thus, the rotational behavior of the dynamometer approaches the rotational behavior of the engine, as compared with control without the inertia compensation. Therefore, the torsion of the shaft is reduced, and the resonance, generated by applying engine explosion variation as a vibration source, is reduced. Thus, according to an aspect of the present invention, the engine test apparatus can be operated without special restriction in operation due to the resonance.

The speed measuring device may be a Doppler velocimeter configured to emit laser light to the one end of the shaft or the output shaft of the engine to contactlessly measure a rotation speed of the output shaft of the engine, and transmit the rotation speed to the control device. According to this configuration, the rotation speed of the output shaft of the engine can be measured with high accuracy in the vicinity of the engine, without influence of the heat of the engine.

Further, the speed measuring device may be an encoder including a rotating slit disk mounted to the one end of the shaft or the rotation shaft of the engine, a light emitting element configured to emit light to the rotating slit disk, and a light reception control device configured to receive light passing through a slit of the rotating slit disk, detect a rotation speed from the received light, and transmit the rotation speed to the control device.

In addition, the dynamometer control unit preferably removes predetermined high-frequency noise from the rotation speed transmitted from the speed measuring device, performs resonance correction process to reduce a gain of a preset specific frequency from a rotation speed from which the high-frequency noise has been removed, recovers a phase delay amount of a preset frequency range by a phase lead compensation process for a rotation speed subjected to the resonance correction, and uses a rotation speed subjected to the phase lead compensation process to generate the torque current command.

According to an embodiment of the present invention, an engine test apparatus can be provided to acquire an accurate "rotation speed of the output shaft of the engine" for use to perform the inertia compensation control, and thus, the characteristics of the engine can be measured with high accuracy as compared with the related art.

DETAILED DESCRIPTION

Figure 6:
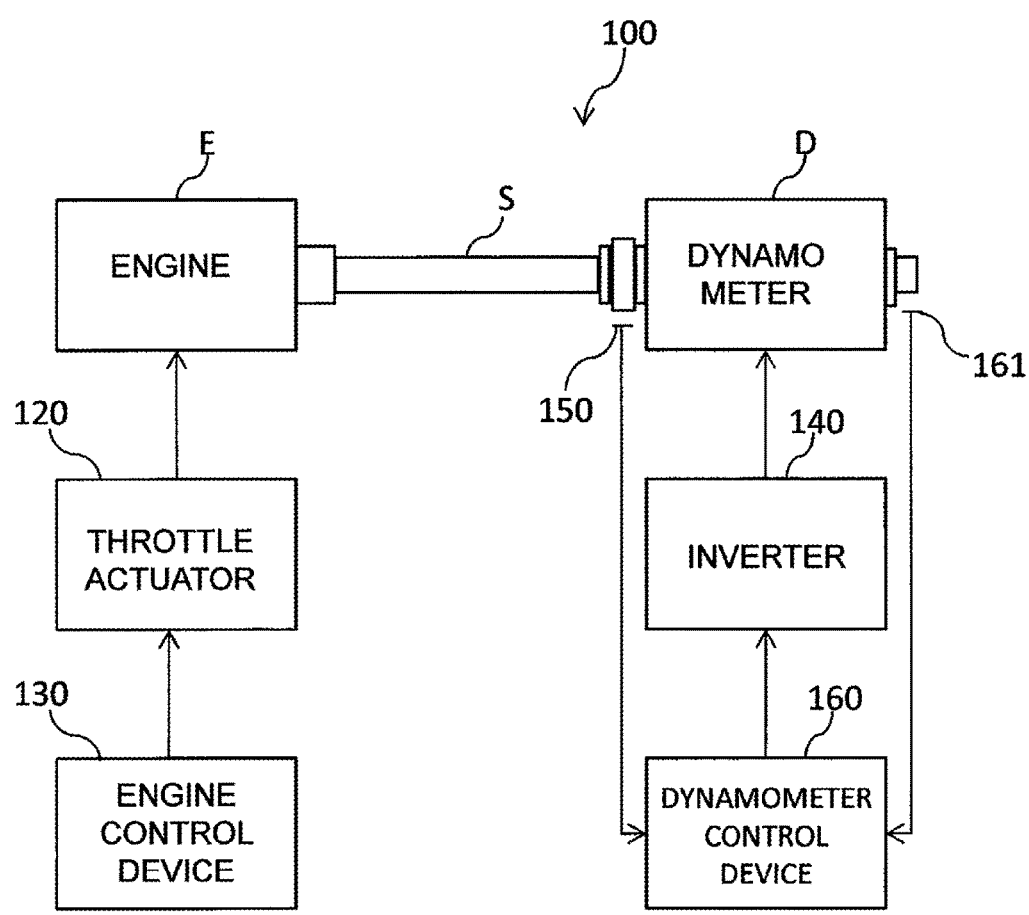
FIG. 6 is a configuration diagram of a dynamometer system according to a related art.
Figure 7:
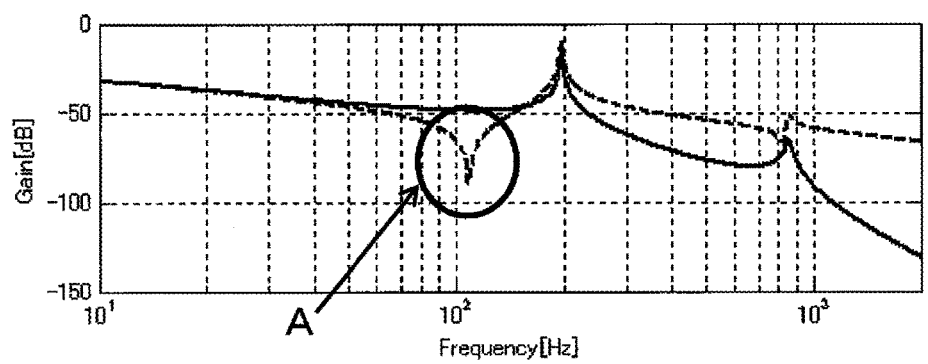
FIGS. 7A and 7B are graphs illustrating a closed-loop transmission characteristic upon inertia compensation of a dynamometer constituting the dynamometer system according to the related art.
Figure 7:
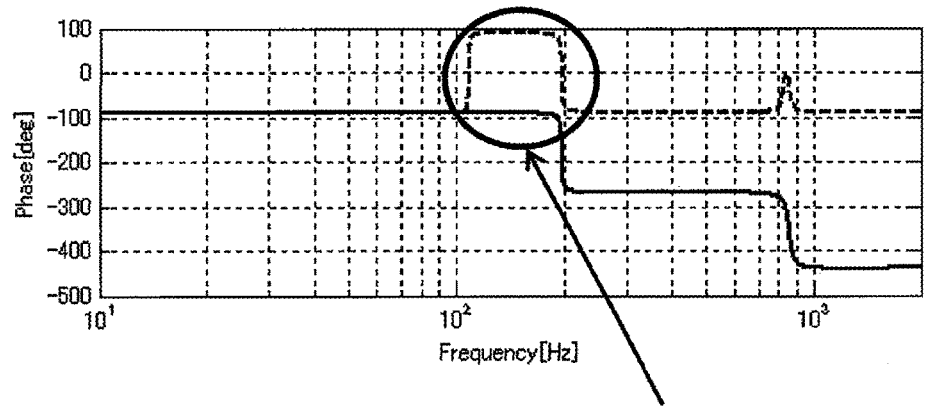

An engine test apparatus according to an embodiment of the present invention will be described below with reference to the drawings. Note that, in the description of the present embodiment, the same constitutions or equivalent configurations as those of the above related art illustrated in FIG. 6 are denoted by the same reference signs. Although the engine test apparatuses according to the present embodiment each perform various performance tests on an engine, inertia compensation control will be exemplified in the following description.

Figure 1:
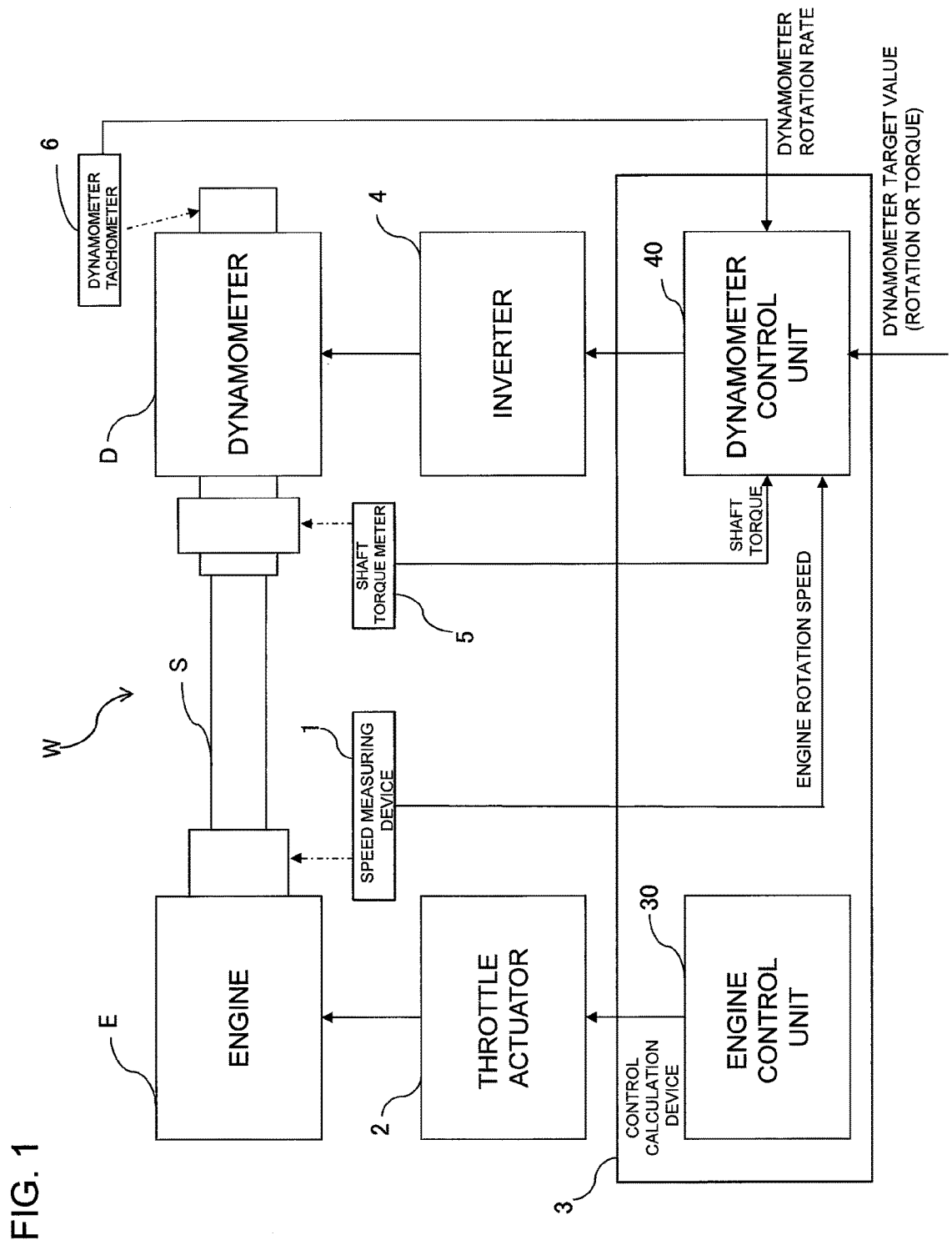
FIG. 1 is a schematic diagram illustrating a configuration of an engine test apparatus according to an embodiment of the present invention.

As illustrated in FIG. 1, an engine test apparatus W according to the present embodiment includes a dynamometer D configured to apply a load to an engine E to be tested, a shaft S configured to connect the dynamometer D and the engine E, a control calculation device (hereinafter simply referred to as "control device") 3 configured to control the operations of the engine E and the dynamometer D, a throttle actuator 2 controlled by the control device 3 to operate the engine, and an inverter 4 controlled by the control device 3 to operate the dynamometer D.

Note that the shaft S is formed in a rod shape having one end connected to an output shaft at one end of a rotation shaft of the engine E, and the other end connected to a rotation shaft of the dynamometer D. This shaft S has high rigidity. Specifically, the shaft S according to the present embodiment connects a power system and the engine E in the engine test apparatus W, has no rattle component such as backlash in a mechanical structure, and has a torsional rigidity having a torsional resonance frequency formed in a rotation system with the shaft S as a spring component of not less than a predetermined value (e.g., not less than 100 Hz (necessary frequency changes depending on a specification of a system)), in the whole system constituting the engine test apparatus W.

Furthermore, the engine test apparatus W is provided with a speed measuring device 1 configured to measure a rotation speed of the rotation shaft of the engine and transmit the rotation speed to the control device 3. Note that, in the present embodiment, the speed measuring device 1 is exemplified as a Doppler velocimeter 1a configured to emit laser light to the one end of the shaft S to contactlessly measure a rotation speed (rotation rate) of the output shaft of the engine E, and transmit the rotation speed to the control device 3.

Figure 2:
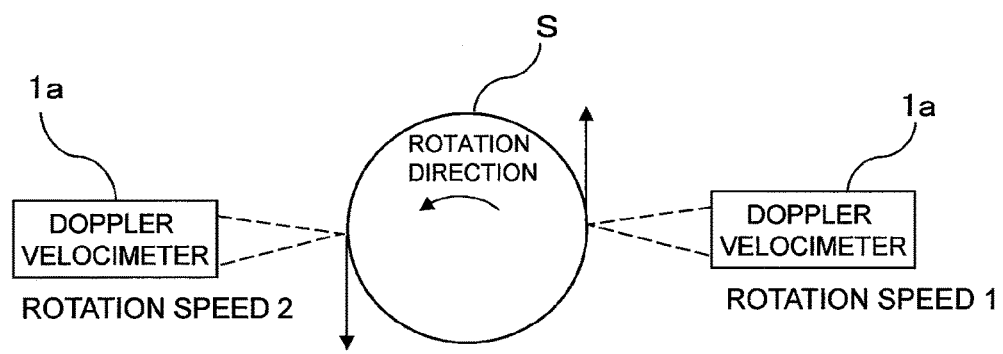
FIG. 2 is a schematic diagram illustrating an installation position of a Doppler velocimeter used as a speed measuring device constituting an engine test apparatus according to an embodiment of the present invention.

Furthermore, in the present embodiment, as illustrated in FIG. 2, one pair (two) of Doppler velocimeters 1a is disposed opposite to each other to face the one end of the shaft S (disposed opposite to each other across the one end of the shaft S). Each of the pair of Doppler velocimeters 1a is set to emit laser light perpendicularly to a side surface of the one end of the shaft S, and detects a rotation speed at a laser-illuminated point of the one end of the shaft S. Note that, in an example illustrated in FIG. 2, the one pair (two) of Doppler velocimeters 1a is disposed in a horizontal direction, but is not particularly limited thereto. As long as the pair (two) of Doppler velocimeters 1a is disposed to oppose the shaft S, the Doppler velocimeters 1 may be at any installation positions. In addition, in the example illustrated in FIG. 2, the Doppler velocimeters 1a are disposed opposite to each other to face the one end of the shaft S, but the Doppler velocimeters 1a are not particularly limited the above configuration. For example, the pair (two) of Doppler velocimeters 1a may be disposed opposite to each other to face the output shaft of the engine E to emit laser light to the output shaft of the engine E to measure the rotation speed of the output shaft of the engine E.

Furthermore, the engine test apparatus W is provided with a shaft torque meter 5 disposed at the other end of the shaft S (end near the dynamometer D) to detect a torsion torque of the shaft S and transmit the torsion torque to the control device 3, and a dynamometer tachometer (encoder) 6 configured to detect a rotation speed (rotation rate) of an output shaft of the dynamometer D and transmit the rotation speed to the control device 3. Note that the shaft torque meter 5 and the dynamometer tachometer 6 have a well-known configuration.

Furthermore, the control device 3 includes an engine control unit 30 configured to control the engine E through the throttle actuator 2 configured to operate the engine E, and a dynamometer control unit 40 configured to control the dynamometer D through the inverter 4 configured to supply power to the dynamometer D.

Note that although a hardware configuration of the control device 3 is not particularly limited, for example, the control device 3 may be constituted by a computer (at least one computer) including a CPU, an auxiliary storage device, a main storage device, a network interface, and an input/output interface. In this configuration, the two Doppler velocimeters 1a, the shaft torque meter 5, the dynamometer tachometer 6, and a control processing device (not illustrated) configured to transmit a dynamometer target value are connected to the input/output interface. Furthermore, in the auxiliary storage device, a program is stored to achieve functions of the engine control unit 30 and the dynamometer control unit 40. The functions of the engine control unit 30 and the dynamometer control unit 40 are achieved by loading the program into the main storage device to be executed by the CPU.

Furthermore, the engine control unit 30 is configured to receive a request from an operator, start the engine E through the throttle actuator 2, and operate the engine E in a predetermined manner. Note that since the function of the engine control unit 30 according to the present embodiment is the same as that of a well-known art, and a detailed description thereof will be omitted.

Furthermore, the dynamometer control unit 40 is configured to receive rotation speeds (rotation speed 1, rotation speed 2) of the output shaft of the engine E transmitted from the two Doppler velocimeters 1a, and calculate an average value ((rotation speed 1+rotation speed 2)/2) of the received rotation speeds (absolute values). An average value of measured rotation speeds is calculated in this way by the pair of Doppler velocimeters 1a disposed opposite to each other to face the one end of the shaft S, for the following reason.

Specifically, in the measurement by the Doppler velocimeters 1a illustrated in FIG. 2, vibration in a direction perpendicular to a laser emission direction and a in a direction detected as the rotation speed (vertical direction illustrated in FIG. 2) (hereinafter referred to as "vibration of main body of the engine E", for convenience of description) of vibrations of the engine E or the shaft S is measured as the rotation speed. Note that in this case, "vibration in a thrust direction of the shaft S" and "vibration in a front-rear direction to the laser-illuminated point (right and left direction in FIG. 2)" are not measured. That is, the rotation speed measured by the Doppler velocimeter 1a illustrated in FIG. 2 includes "vibration of main body of the engine E" as rotation noise. Therefore, in the present embodiment, an average value of rotation speeds measured by the pair of Doppler velocimeters 1a disposed opposite to each other to face the one end (the end near the engine E) of the shaft S is calculated to cancel the rotation noise caused by the vibration of main body of the engine E (vibration in the vertical direction in the example of FIG. 2), and an accurate value of the rotation speed (rotation rate) of output shaft of the engine E can be acquired.

Furthermore, the dynamometer control unit 40 controls the operation of the dynamometer D through the inverter 4 so that the engine E operated by the engine control unit 30 is operated in the unloaded state as if "the shaft S and the dynamometer D" are not connected, by using the calculated "average value of the rotation speed (rotation rate) of the output shaft of the engine E" to generate a torque current command (dynamometer command value) corresponding to a torque value to be generated in the dynamometer D, and inputting the torque current command to the inverter 4 (thereby operation of the engine E is also controlled).

Note that the dynamometer control unit 40 is configured to receive the torsion torque of the shaft S measured by the shaft torque meter 5, the rotation speed (rotation rate) of the output shaft of the dynamometer D measured by the dynamometer tachometer 6, and the dynamometer target value (rotation rate or torque) transmitted from the control processing device not illustrated. Furthermore, the dynamometer control unit 40 is configured to use the above measured values (torsion torque, rotation speed (rotation rate) of the output shaft of the dynamometer D), and the dynamometer target value (rotation rate or torque) for processing other than the inertia compensation control. However, since the control using the measured values (torsion torque, rotation speed (rotation rate) of the output shaft of the dynamometer D) and the dynamometer target value (rotation rate or torque) is similar to that of the well-known art, and description thereof will be omitted.

Figure 3:
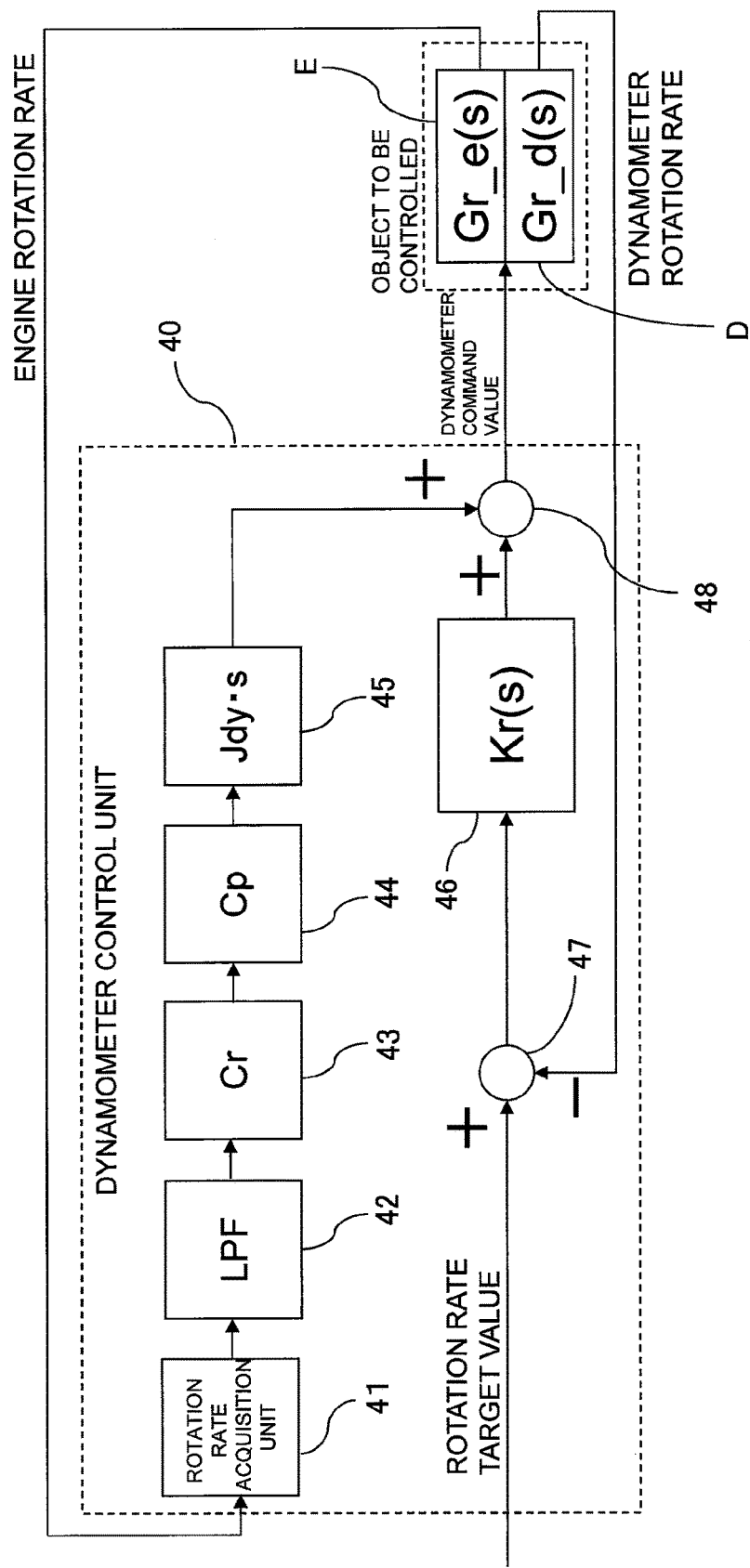
FIG. 3 is a schematic diagram illustrating a function of an inertia compensation control process performed by a dynamometer control unit of an engine test apparatus according to an embodiment of the present invention.
Figure 4:
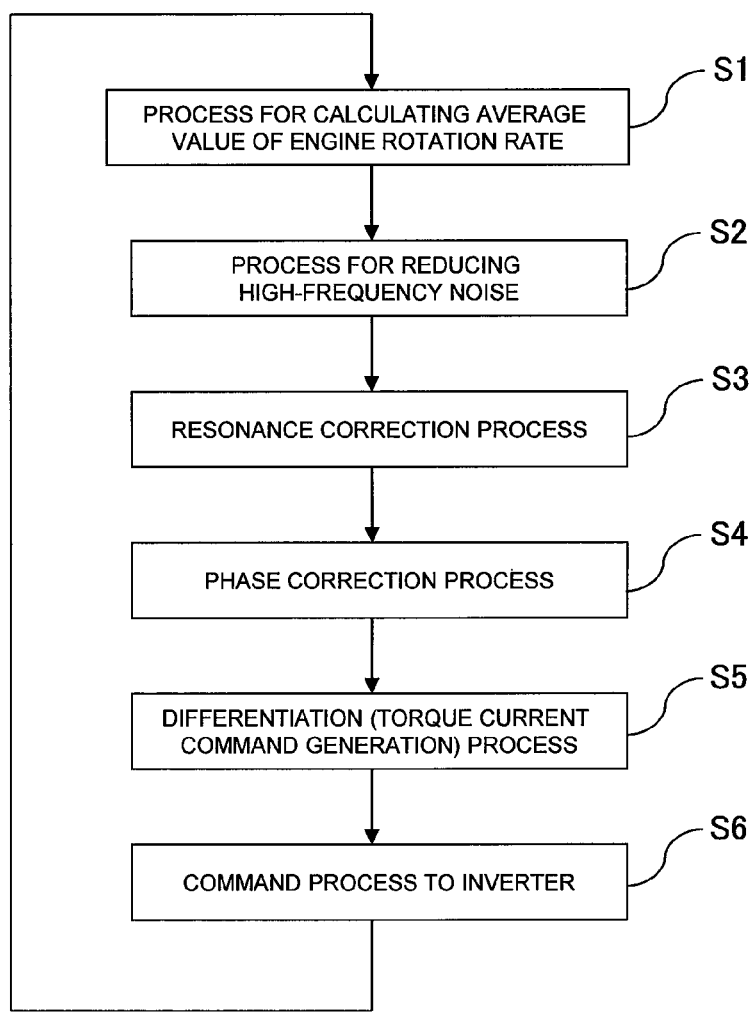
FIG. 4 is a flowchart illustrating an inertia compensation control process of one control cycle performed by the dynamometer control unit of the engine test apparatus according to an embodiment of the present invention.

Here, the "inertia compensation control" performed by the dynamometer control unit 40 will be described with reference to FIGS. 3 and 4. Here, FIG. 3 is a schematic diagram illustrating a function of the inertia compensation control process performed by the dynamometer control unit of the engine test apparatus according to the present embodiment. FIG. 4 is a flowchart illustrating one control cycle of the inertia compensation control process performed by the dynamometer control unit of the engine test apparatus according to the present embodiment.

Note that S2 to S6 of the flowchart illustrated in FIG. 4 are similar to those of the well-known art, excepting use of the rotation speed (rotation rate) of the output shaft of the engine E, and description thereof is simplified below. In addition, before start of the flowchart illustrated in FIG. 4, the engine E is started by the engine control unit 30.

As illustrated in FIG. 3, the dynamometer control unit 40 includes a rotation rate acquisition unit 41, a low-pass filter unit 42, a resonance correction unit 43, a phase correction unit 44, a torque command generation unit 45, a dynamometer rotation rate control unit 46, a reception unit 47 configured to receive a dynamometer target value and a dynamometer rotation rate, and a transmission unit 48 configured to transmit a torque current command (dynamometer command value) to the inverter 4 (not illustrated in FIG. 3). Note that since the dynamometer rotation rate control unit 46 and the reception unit 47 are not related to the "inertia compensation control", their explanation will be omitted.

In the inertia compensation control process, as illustrated in FIG. 4, first, the rotation rate acquisition unit 41 receives rotation speeds (rotation rates) of the output shaft of the engine E transmitted from the two Doppler velocimeters 1*a*, calculates an average value (rotation rate) of the received rotation speeds, outputs the average value to the low-pass filter unit 42 (S1), and the process proceeds to S2.

In S2, the low-pass filter unit 42 removes a high-frequency noise (frequency component exceeding a resonance frequency range to be damped (e.g., frequency component around 300 Hz) (S2), from the average value (rotation rate) of the rotation speed calculated in S1, and proceeds to S3.

In S3, the resonance correction unit 43 performs a resonance correction process for reducing the gain of a preset resonance portion (specific frequency) from the rotation rate from which the high-frequency noise described above is removed, and the process proceeds to S4.

In S4, the phase correction unit 44 recovers a phase delay amount of a preset frequency range (predetermined frequency range (frequency around low frequency to 100 Hz)) by a phase lead compensation process, for the rotation rate subjected to the resonance correction in S3, and the process proceeds to S5.

In S5, the torque command generation unit 45 uses the rotation rate subjected to the phase correction in S4 to generate a torque current command (dynamometer command value) corresponding to a torque value to be generated in the dynamometer D so that the engine E is operated in the unloaded state as if "the shaft S and the dynamometer D" are not connected. Specifically, the torque command generation unit 45 converts the rotation rate subjected to the phase correction in S4 to the dimension of torque (conversion by differential operation) to generate a torque current command (dynamometer command value), and outputs the generated torque current command (dynamometer command value) to the transmission unit 48.

In S6, the transmission unit 48 transmits the torque current command (dynamometer command value) generated in S5 to the inverter 4, and the process returns to S1. Note that the inverter 4 uses the received torque current command (dynamometer command value) to control the operation of the dynamometer D, and thus, the engine E is controlled to be operated in the unloaded state as if "the shaft S and the dynamometer D" are not connected.

Note that the inventor of the present application conducted a comparative test to verify the effects of the inertia compensation control illustrated in S1 to S6 of FIG. 4. Specifically, a comparison test is conducted to measure and compare a change in rotation rate of an engine where the engine E is connected to the engine test apparatus W, and operated by inertia compensation control, a change in rotation rate of an engine where the engine E is connected to the engine test apparatus W, and operated without the inertia compensation control, and a change in rotation rate of an engine where the engine E is not connected to the engine test apparatus W, and singularly operated. Thus, the results illustrated in FIG. 5 are obtained.

Figure 5:
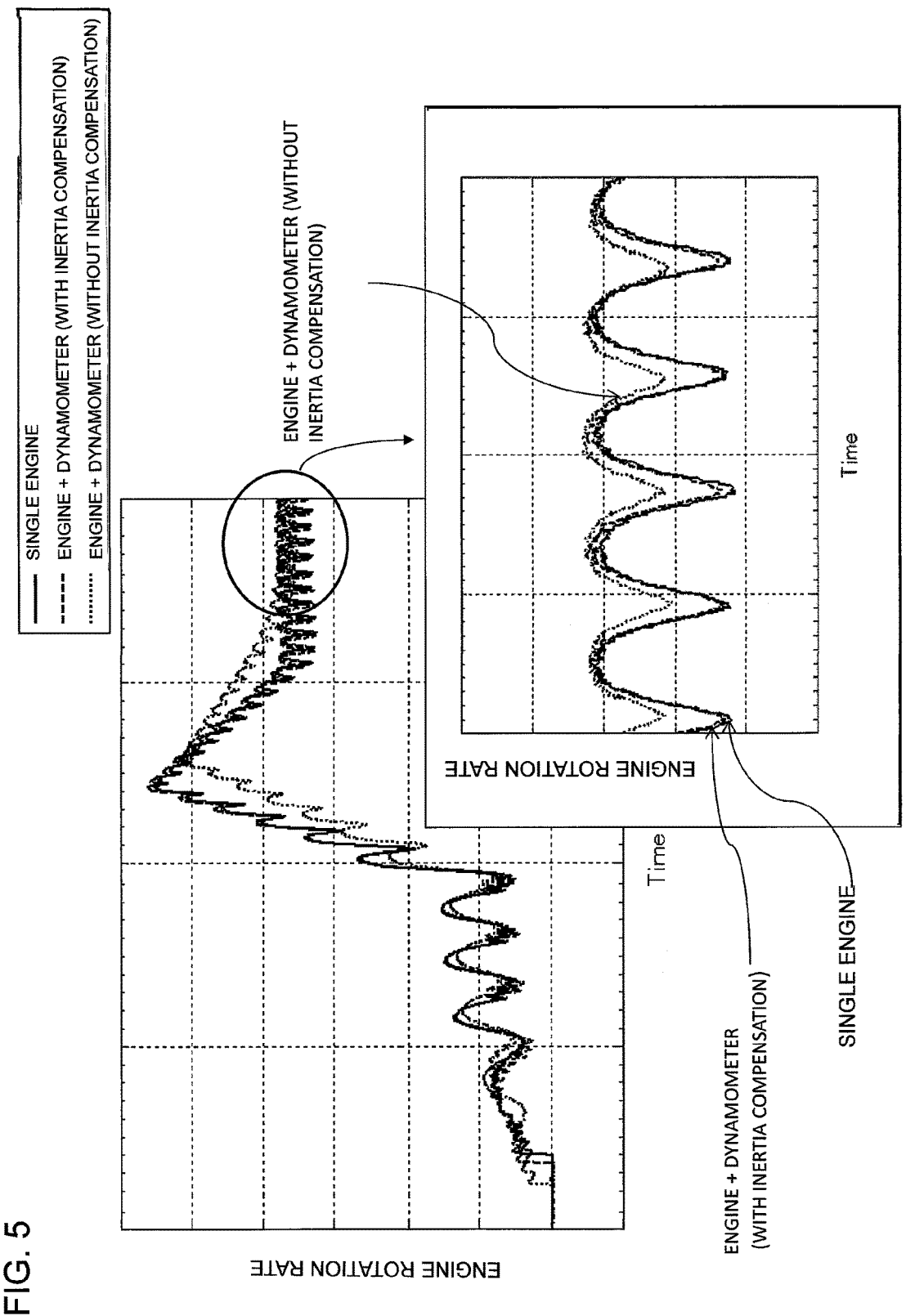
FIG. 5 is graphs illustrating a change in rotation rate with time of an engine where the engine is connected to the engine test apparatus according to the present embodiment, and operated by inertia compensation control, a change in rotation rate with time of an engine where the engine is connected to the engine test apparatus according to the present embodiment, and operated without the inertia compensation control, and a change in rotation rate with time of an engine where the engine is not connected to the engine test apparatus according to the present embodiment, and singularly operated.

Note that FIG. 5 is graphs illustrating a change in rotation rate with time of an engine where the engine is connected to the engine test apparatus according to the present embodiment, and operated by inertia compensation control, a change in rotation rate with time of an engine where the engine is connected to the engine test apparatus according to the present embodiment, and operated without the inertia compensation control, and a change in rotation rate with time of an engine where the engine is not connected to the engine test apparatus according to the present embodiment, and singularly operated.

FIG. 5 shows that the change in rotation rate with time of an engine where the engine E is connected to the engine test apparatus W, and operated by inertia compensation control, resembles the change in rotation rate with time of an engine where the engine is singularly operated (almost overlaps). From this result, when the engine E is operated using the inertia compensation control by the engine test apparatus W according to the present embodiment, it can be recognized that the operation of the engine E considerably closer to the single operation of the engine.

As described above, in the present embodiment, there is provided a Doppler velocimeter 1*a* which measures the rotation speed of the output shaft of the engine E and transmits the rotation speed to the control device 3. The engine test apparatus W according to the present embodiment uses the rotation speed transmitted from the Doppler velocimeter 1*a* to generate a torque current command corresponding to a torque value to be generated in the dynamometer D, and outputs the torque current command to the dynamometer D to control the operation of the dynamometer D so that the engine E is operated in an unloaded state as if the shaft S and the dynamometer D are not connected. According to this configuration, the frequency range for inertia compensation is not limited as in the inertia compensation control according to the related art using the rotation speed of the dynamometer (dynamometer rotation rate). Therefore, not only the behavior of the engine E at starting up, but also rotation speed variation of the engine E caused by explosion variation can be reproduced. Thus, according to the present embodiment, the characteristics of the engine E can be measured with high accuracy, in comparison with the related art.

Further, according to the configuration of the present embodiment, after influence of inertia of the dynamometer D is canceled by the above processes, the torque current command is further transmitted from the dynamometer rotation rate control unit 46, and a load can be applied to the engine E. Owing to this process, test of the engine E can be performed in a loaded state (e.g., a state where a torque load is applied to the engine E, such as during acceleration). Note that the process of transmitting the torque current command from the dynamometer rotation rate control unit 46 is an existing conventional technology.

Furthermore, in the present embodiment, a Doppler velocimeter 1a configured to contactlessly measure a rotation speed of the output shaft of the engine E is used for measuring a rotation speed of the output shaft of the engine E. Therefore, according to the present embodiment, the rotation speed of the output shaft of the engine can be measured with high accuracy in the vicinity of the engine, without influence of the heat of the engine, and the Inertia compensation control can be performed using the measured value.

As described above, according to the present embodiment, an engine test apparatus W can be provided to measure the characteristics of an engine with high accuracy.

It should be noted that the present invention is not limited to the above embodiments, and various changes and modifications may be made within the spirit and scope of the present invention.

For example, in the above embodiment, the Doppler velocimeter 1a is exemplified as the speed measuring device 1 measuring the rotation speed of the rotation shaft of the engine E and transmitting the rotation speed to the control device 3, but the speed measuring device 1 is not particularly limited to the Doppler velocimeter 1a. The speed measuring device 1 may be an encoder including a rotating slit disk mounted to the one end of the shaft S or the output shaft of the engine E (one end of the rotation shaft of the engine E), a light emitting element configured to emit light to the rotating slit disk, and a light reception control device configured to receive light passing through a slit of the rotating slit disk (light from the light emitting element), detect a rotation speed from the received light, and transmit the rotation speed to the control device. In this configuration, the encoder desirably has a resolution as high as possible (e.g., resolution of not less than "20,000 ppr"). Note that the rotating slit disk may be mounted to the other end of the rotation shaft of the engine E to which the shaft S is not connected, instead of the one end of the shaft S or the output shaft of the engine E (one end of the rotation shaft of the engine E).

As described above, even when the encoder is employed for the speed measuring device 1, a rotation speed of the output shaft of the engine E can be measured in the vicinity of the engine or the like and the inertia compensation control can be performed using the measured value, and thus the frequency range for inertia compensation is not limited as in the inertia compensation control according to the related art using the rotation speed of the dynamometer (dynamometer rotation rate).

Furthermore, in the above embodiment, measurement of the rotation speed of the output shaft of the engine E is performed by the pair (two) of Doppler velocimeters 1a, but is not particularly limited thereto. The rotation speed of the output shaft of the engine E may be measured by one Doppler speedometer 1a. In this configuration, the process of S1 in FIG. 4 described above is changed as follows. Specifically, the rotation rate acquisition unit 41 of the dynamometer control unit 40 receiving the rotation speed of the output shaft of the engine E transmitted from the Doppler velocimeter 1, outputs the received rotation speed to the low-pass filter unit 42. Note that the processes of S2 to S6 are the same as those of the embodiment described above.

REFERENCE SIGNS LIST

W engine test apparatus
E engine
S shaft
D dynamometer
1 Doppler velocimeters
2 throttle actuator
3 control calculation device (control device)
4 inverter
5 shaft torque meter
6 dynamometer tachometer
8 displacement meter
30 engine control unit
40 dynamometer control unit
41 rotation rate acquisition unit
42 low-pass filter unit
43 resonance correction unit
44 phase correction unit
45 torque command generation unit
46 dynamometer rotation rate control unit
47 reception unit
48 transmission unit

What is claimed is:
1. An engine test apparatus comprising:
a dynamometer connected to an engine through a shaft; and
a control device configured to control operations of the engine and the dynamometer,
wherein the shaft has one end connected to an output shaft at one end of a rotation shaft of the engine, and the other end connected to a rotation shaft of the dynamometer, and
includes a speed measuring device configured to measure a rotation speed of the output shaft of the engine and transmit the rotation speed to the control device,
the control device includes an engine control unit configured to control operation of the engine, and a dynamometer control unit configured to control operation of the dynamometer,
the dynamometer control unit performs inertia compensation control by using the rotation speed transmitted from the speed measuring device to generate a torque current command corresponding to a torque value to be generated by the dynamometer, and outputting the torque current command to the dynamometer, in order to control operation of the dynamometer to operate the engine controlled to be operated by the engine control unit in an unloaded state as if the shaft and the dynamometer are not connected, wherein
the speed measuring device may be an encoder including a rotating slit disk mounted to the one end of the shaft or the rotation shaft of the engine, a light emitting element configured to emit light to the rotating slit disk, and a light reception control device configured to receive light passing through a slit of the rotating slit disk, detect a rotation speed from the received light, and transmit the rotation speed to the control device.

2. The engine test apparatus according to claim 1, wherein the dynamometer control unit removes predetermined high-frequency noise from the rotation speed transmitted from the speed measuring device, performs resonance correction process to reduce a gain of a preset specific frequency from a rotation speed from which the high-frequency noise has been removed, recovers a phase delay amount of a preset frequency range by a phase lead compensation process for a rotation speed subjected to the resonance correction, and uses a rotation speed subjected to the phase lead compensation process to generate the torque current command.

3. An engine test apparatus comprising:
a dynamometer connected to an engine through a shaft; and
a control device configured to control operations of the engine and the dynamometer,
wherein the shaft has one end connected to an output shaft at one end of a rotation shaft of the engine, and the other end connected to a rotation shaft of the dynamometer, and
includes a speed measuring device configured to measure a rotation speed of the output shaft of the engine and transmit the rotation speed to the control device,
the control device includes an engine control unit configured to control operation of the engine, and a dynamometer control unit configured to control operation of the dynamometer,
the dynamometer control unit performs inertia compensation control by using the rotation speed transmitted from the speed measuring device to generate a torque current command corresponding to a torque value to be generated by the dynamometer, and outputting the torque current command to the dynamometer, in order to control operation of the dynamometer to operate the engine controlled to be operated by the engine control unit in an unloaded state as if the shaft and the dynamometer are not connected, wherein
the dynamometer control unit removes predetermined high-frequency noise from the rotation speed transmitted from the speed measuring device, performs resonance correction process to reduce a gain of a preset specific frequency from a rotation speed from which the high-frequency noise has been removed, recovers a phase delay amount of a preset frequency range by a phase lead compensation process for a rotation speed subjected to the resonance correction, and uses a rotation speed subjected to the phase lead compensation process to generate the torque current command.

4. An engine test apparatus comprising:
a dynamometer connected to an engine through a shaft; and
a control device configured to control operations of the engine and the dynamometer,
wherein the shaft has one end connected to an output shaft at one end of a rotation shaft of the engine, and the other end connected to a rotation shaft of the dynamometer, and
includes a speed measuring device configured to measure a rotation speed of the output shaft of the engine and transmit the rotation speed to the control device,
the control device includes an engine control unit configured to control operation of the engine, and a dynamometer control unit configured to control operation of the dynamometer,
the dynamometer control unit performs inertia compensation control by using the rotation speed transmitted from the speed measuring device to generate a torque current command corresponding to a torque value to be generated by the dynamometer, and outputting the torque current command to the dynamometer, in order to control operation of the dynamometer to operate the engine controlled to be operated by the engine control unit in an unloaded state as if the shaft and the dynamometer are not connected, wherein
the speed measuring device is a Doppler velocimeter configured to emit laser light to the one end of the shaft or the output shaft of the engine to contactlessly measure a rotation speed of the output shaft of the engine, and transmit the rotation speed to the control device, wherein
the dynamometer control unit removes predetermined high-frequency noise from the rotation speed transmitted from the speed measuring device, performs resonance correction process to reduce a gain of a preset specific frequency from a rotation speed from which the high-frequency noise has been removed, recovers a phase delay amount of a preset frequency range by a phase lead compensation process for a rotation speed subjected to the resonance correction, and uses a rotation speed subjected to the phase lead compensation process to generate the torque current command.

* * * * *